US012643164B2

(12) United States Patent
Seifert

(10) Patent No.: US 12,643,164 B2
(45) Date of Patent: Jun. 2, 2026

(54) MITER SAW INCLUDING A MULTI-LINK SLIDING ASSEMBLY

(71) Applicant: MILWAUKEE ELECTRIC TOOL CORPORATION, Brookfield, WI (US)

(72) Inventor: Jacob R. Seifert, Lake Mills, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 154 days.

(21) Appl. No.: 18/142,103

(22) Filed: May 2, 2023

(65) Prior Publication Data

US 2023/0356309 A1 Nov. 9, 2023

Related U.S. Application Data

(60) Provisional application No. 63/352,290, filed on Jun. 15, 2022, provisional application No. 63/338,510, filed on May 5, 2022.

(51) Int. Cl.
B23D 45/04 (2006.01)
B23D 45/14 (2006.01)
(Continued)

(52) U.S. Cl.
CPC ........... B23D 45/048 (2013.01); B23D 45/14 (2013.01); B23D 47/025 (2013.01); B27B 5/29 (2013.01)

(58) Field of Classification Search
CPC .. B23D 45/045; B23D 45/025; B23D 45/048; B23D 45/14; B27B 5/208; B27B 5/188;
(Continued)

(56) References Cited

U.S. PATENT DOCUMENTS

| | | | |
|---|---|---|---|
| 1,707,764 A | 4/1929 | Mattison | |
| 1,765,733 A | 6/1930 | Olsen | |

(Continued)

FOREIGN PATENT DOCUMENTS

| | | | | |
|---|---|---|---|---|
| CN | 101347847 B | 11/2012 | | |
| DE | 581369 C | * 7/1933 | ............. | B27B 5/208 |

(Continued)

OTHER PUBLICATIONS

Ridgid, "15 Amp Corded 12 inch Dual Bevel Sliding Miter Saw," <https://www.ridgid.com/us/en/15-amp-corded-12-inch-dual-bevel-sliding-miter-saw-r4251> web page visted May 3, 2023 (6 pages).

*Primary Examiner* — Laura M Lee
(74) *Attorney, Agent, or Firm* — Michael Best & Friedrich LLP

(57) ABSTRACT

A miter saw includes a base, a table, a cutting assembly, and a linkage assembly. The table defines a supporting surface and is rotatably coupled to the base to rotate about a miter axis. The cutting assembly includes a housing that supports a motor to which a saw blade is rotatably coupled, and a handle that extends from the housing. The cutting assembly is pivotable between raised and lowered positions and is movable relative to the table between forward and rearward positions. The linkage assembly is pivotally coupled to the table and the cutting assembly. The linkage assembly includes a floating link, a first link, and a second link. The floating link is pivotally coupled to the cutting assembly. The first link is pivotally coupled to the table and the floating link. The second link is pivotally coupled to the table and to the floating link.

13 Claims, 17 Drawing Sheets

(51) Int. Cl.
 *B23D 47/02* (2006.01)
 *B27B 5/29* (2006.01)

(58) Field of Classification Search
 CPC ... B27B 5/29; Y10T 83/7697; Y10T 83/7693;
 Y10T 83/8773
 See application file for complete search history.

(56) References Cited

U.S. PATENT DOCUMENTS

| | | | |
|---|---|---|---|
| 1,766,650 | A | 6/1930 | Kistner et al. |
| 2,005,051 | A | 6/1935 | Rubin |
| 2,729,249 | A | 1/1956 | Keipp |
| 3,540,338 | A | 11/1970 | McEwan et al. |
| 3,794,283 | A | 2/1974 | Furno |
| 5,257,570 | A | 11/1993 | Shiotani et al. |
| 6,532,853 | B1 | 3/2003 | Kakimoto et al. |
| 6,892,618 | B2 | 5/2005 | Chin-Chin |
| 7,059,228 | B2 | 6/2006 | Chang |
| 8,322,261 | B2 | 12/2012 | Liu et al. |
| 8,499,672 | B2 | 8/2013 | Oberheim |
| 8,522,657 | B2 | 9/2013 | Oohama |
| 8,631,734 | B2 | 1/2014 | Liu |
| D704,235 | S | 5/2014 | Liu et al. |
| 8,752,461 | B2 | 6/2014 | Oberheim et al. |
| 8,857,303 | B2 | 10/2014 | Liu et al. |
| 8,881,631 | B2 | 11/2014 | Liu |
| 9,387,598 | B2 | 7/2016 | Voong et al. |
| D767,654 | S | 9/2016 | Liu et al. |
| 9,844,822 | B2 | 12/2017 | Cheng |
| 10,150,171 | B2 | 12/2018 | Bliznyuk |
| 10,207,345 | B2 | 2/2019 | Marinov et al. |
| 2007/0137452 | A1 | 6/2007 | Oberheim |
| 2007/0151434 | A1 | 7/2007 | Oberheim |
| 2008/0264224 | A1 | 10/2008 | Chen |
| 2010/0058909 | A1 | 3/2010 | Chen |
| 2012/0017736 | A1 | 1/2012 | Thomas et al. |
| 2019/0210241 | A1 | 7/2019 | Chang |

FOREIGN PATENT DOCUMENTS

| | | | | |
|---|---|---|---|---|
| DE | 8803094 | U1 | 9/1988 | |
| DE | 4123435 | A1 * | 1/1992 | .......... B23D 45/044 |
| DE | 4206890 | A1 | 9/1993 | |
| DE | 19505867 | A1 | 8/1996 | |
| DE | 60319783 | T2 | 4/2009 | |
| DE | 102019129535 | A1 | 5/2021 | |
| DE | 102022129083 | A1 * | 5/2024 | ......... B23D 59/0064 |
| DE | 102022129084 | A1 * | 5/2024 | ............ B27B 5/208 |
| EP | 2208592 | A1 | 7/2010 | |
| EP | 2208593 | A1 | 7/2010 | |
| EP | 3283250 | | 2/2018 | |
| JP | S5633225 | A | 4/1981 | |
| JP | 04366601 | A * | 12/1992 | .............. B27B 5/29 |
| JP | H07256603 | A | 10/1995 | |
| JP | H11156801 | A | 6/1999 | |
| WO | 2021004679 | A1 | 1/2021 | |
| WO | 2021173728 | A1 | 9/2021 | |

* cited by examiner

MITER SAW INCLUDING A MULTI-LINK SLIDING ASSEMBLY

CROSS-REFERENCE TO RELATED APPLICATIONS

This application claims priority to U.S. Provisional Patent Application No. 63/352,290, filed on Jun. 15, 2022, and U.S. Provisional Patent Application No. 63/338,510, filed on May 5, 2022, the entire contents of both of which are incorporated herein by reference.

FIELD OF THE INVENTION

The present invention relates to a miter saw, in particular, a miter saw with a multi-link sliding assembly.

BACKGROUND OF THE INVENTION

Miter saws and compound miter saws, i.e., miter saws capable of making a combination of a miter cut and bevel cut in one cutting operation, in particular, often include mechanisms to increase the length of possible cuts while also providing the variability of bevel angle and miter angle that are not possible with a tabletop circular saw, band saw, or the like. In that regard, sliding members, often in the form of cylindrical guide bars slidingly coupled to the bevel arm, are provided with the miter saw to couple the cutting portion to the bevel arm. The sliding members extend, in some instances, a considerable length in a rearward direction from the miter saw, thereby requiring significant amounts of space around the miter saw for operation.

SUMMARY OF THE INVENTION

In one embodiment, the invention provides a miter saw with a cutting assembly coupled to a linkage assembly. The miter saw includes a base and a table rotatably coupled to the base. The cutting assembly includes a housing that supports a motor. A saw blade is rotatably coupled to the motor. A handle extends from the housing. The cutting assembly is pivotable from a raised position to a lowered position and movable relative to the table between a forward position and a rearward position. The linkage assembly is pivotally coupled to the table and the cutting assembly. The linkage assembly includes a floating link, a first link, and a second link. The floating link is pivotally coupled to the cutting assembly. The first link is pivotally coupled to the table and to the floating link. The second link is also pivotally coupled to the table and the to the floating link.

In another embodiment, the invention provides a miter saw including base, a table, a linkage assembly, and a cutting assembly. The table is pivotally coupled to the base. The linkage assembly is pivotally coupled to the table, and the cutting assembly is pivotally coupled to the linkage assembly. The linkage assembly includes a ground link that is pivotally coupled to the table. A first linkage and a second linkage are pivotally coupled to the ground link. A floating link is pivotally coupled to the first linkage and the second linkage and the cutting assembly is pivotally coupled to the floating link. The cutting assembly is slidable in a generally linear path between a forward position and a rearward position. The cutting assembly includes a housing in which a motor is supported and a saw blade that is rotatably coupled to the motor. The linkage assembly also includes a travel stop mechanism coupled to the first and second linkages. A locking mechanism is coupled to the linkage assembly and is pivotable to lock the cutting assembly against sliding.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of miter saws according to the present disclosure illustrated in FIGS. 1A, 1B, and 4A-6B are illustrated as having a cutting linkage representative of a cutting assembly and a base structure representative of and substituted in place of the base and table. The miter saws of these embodiments may be coupled to any of the bases of the embodiments of miter saws illustrated in the other figures.

Figure 1A:
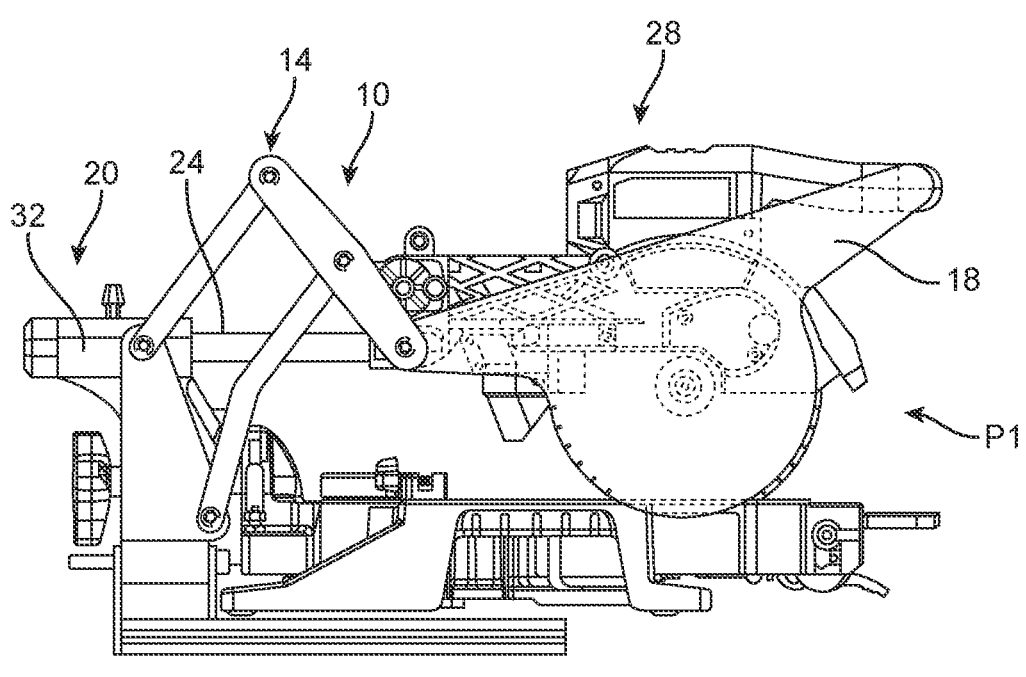
FIG. 1A is a side view of a miter saw according to the present invention overlaying a prior art miter saw.
Figure 1B:
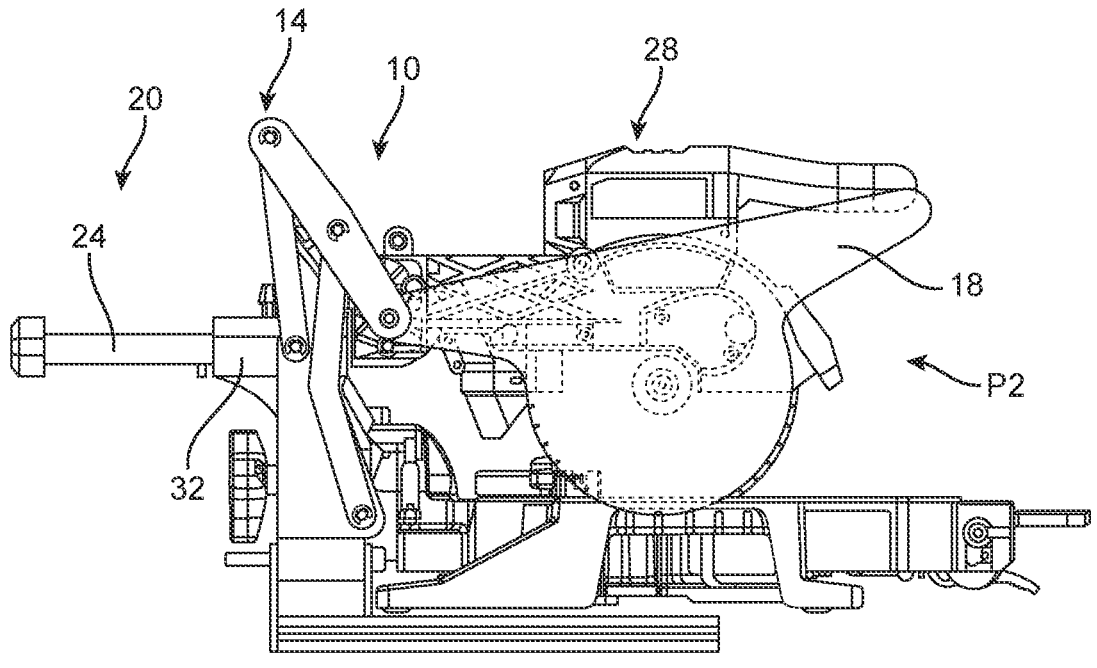
FIG. 1B is a side view of a miter saw according to the present invention overlaying a prior art miter saw.

FIGS. 1A and 1B illustrate a miter saw 10 according to an embodiment of the invention in comparison to a prior art miter saw 20. The miter saw 10 includes a linkage assembly 14 coupled to a cutting assembly 18 (illustrated as a cutting assembly link). The prior art miter saw 20 includes a pair of slide members 24 coupled to a cutting assembly 28. The slide members 24 extend through a bevel arm 32 in a rearward direction of the prior art miter saw 20. FIG. 1A illustrates the miter saws 10, 20 in a forward position P1 (e.g., the cutting assembly 18 at a furthest-away position from the bevel arm 32 and closest to a user). FIG. 1B illustrates the miter saws 10, 20 in a rearward position P2 (e.g., the cutting assembly 18 at a position closest to the bevel arm 32 and furthest away from the user).

Figure 2:
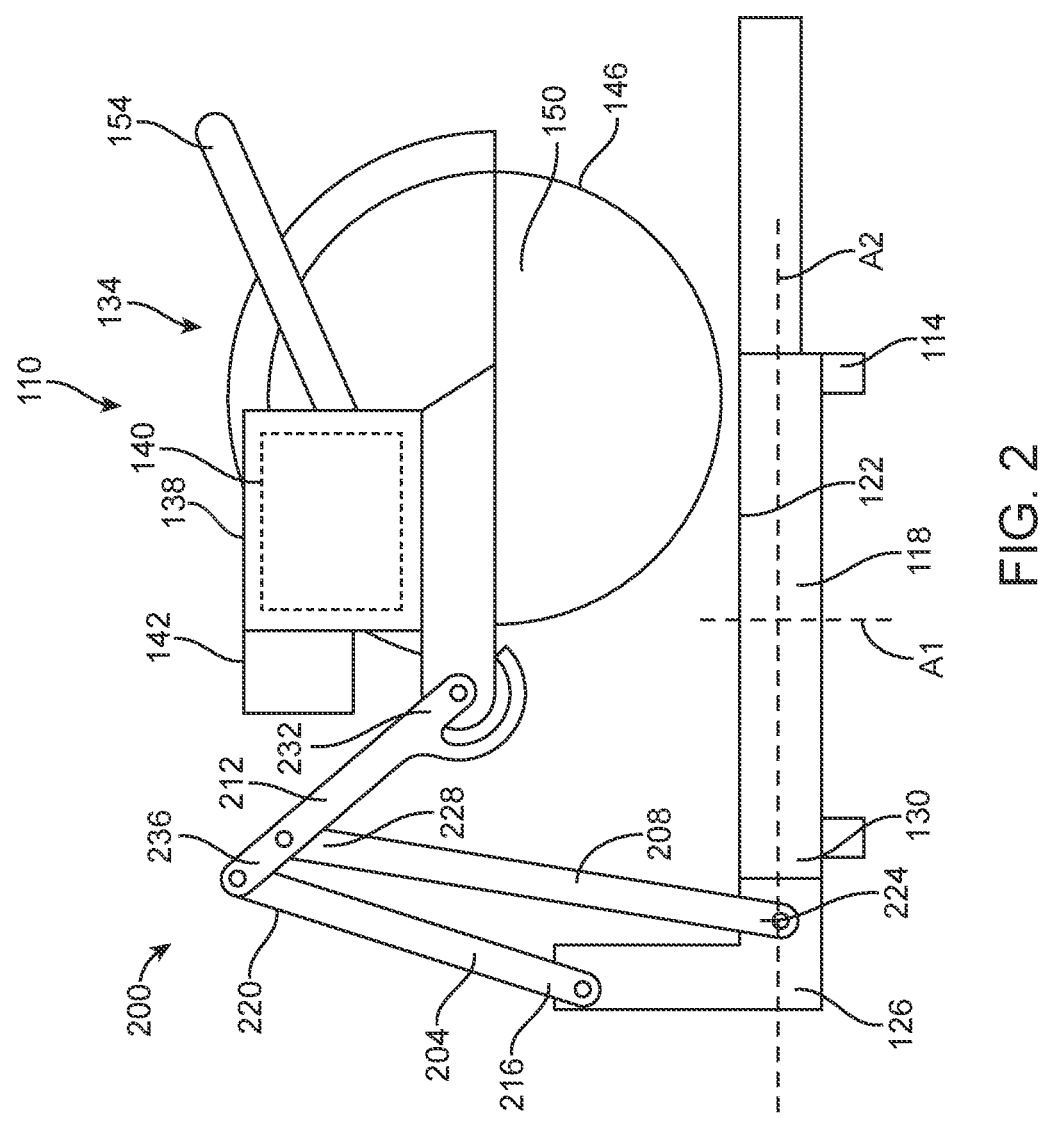
FIG. 2 is a side view of a miter saw according to the present invention.

FIG. 2 illustrates another embodiment of a miter saw 110 alone. The miter saw 110 includes a base 114 and a table 118 that is rotatably coupled to the base 114. The table 118 rotates relative to the base 114 about a miter axis A1. The table 118 includes a supporting surface 122 on which a workpiece is supported during the cutting operation. A bevel arm 126 is coupled to and extends rearward and upward from the table 118 at a rear portion 130 of the table 118. In one embodiment of the miter saw 110 as a compound miter saw, the bevel arm 126 is pivotally coupled to the table 118 and is rotatable about a bevel axis A2, or ground axis.

The miter saw 110 includes a cutting assembly 134 that is coupled to the table 118. The cutting assembly 134 includes a housing 138 that supports a motor 140 (illustrated schematically). In some embodiments, the motor is a brushless DC electric motor. A rechargeable battery 142 is removably coupled to the housing 138, for instance, by sliding the rechargeable battery 142 relative to the housing 138. The rechargeable battery 142 is electrically coupled to the motor 140 and provides a power source for the motor 140. The cutting assembly 134 also includes a saw blade 146 that is rotatably coupled to the motor 140 (for instance, via a transmission assembly which may include gears, a belt-drive system, etc.). The saw blade 146 defines a cutting plane Cl (shown in FIG. 4A) that is coplanar with and includes the side surface 150 of the saw blade 146. A handle 154 extends from the housing 138 and includes a switch (not shown) for activating the motor 140 to turn the saw blade 146.

Figure 3:
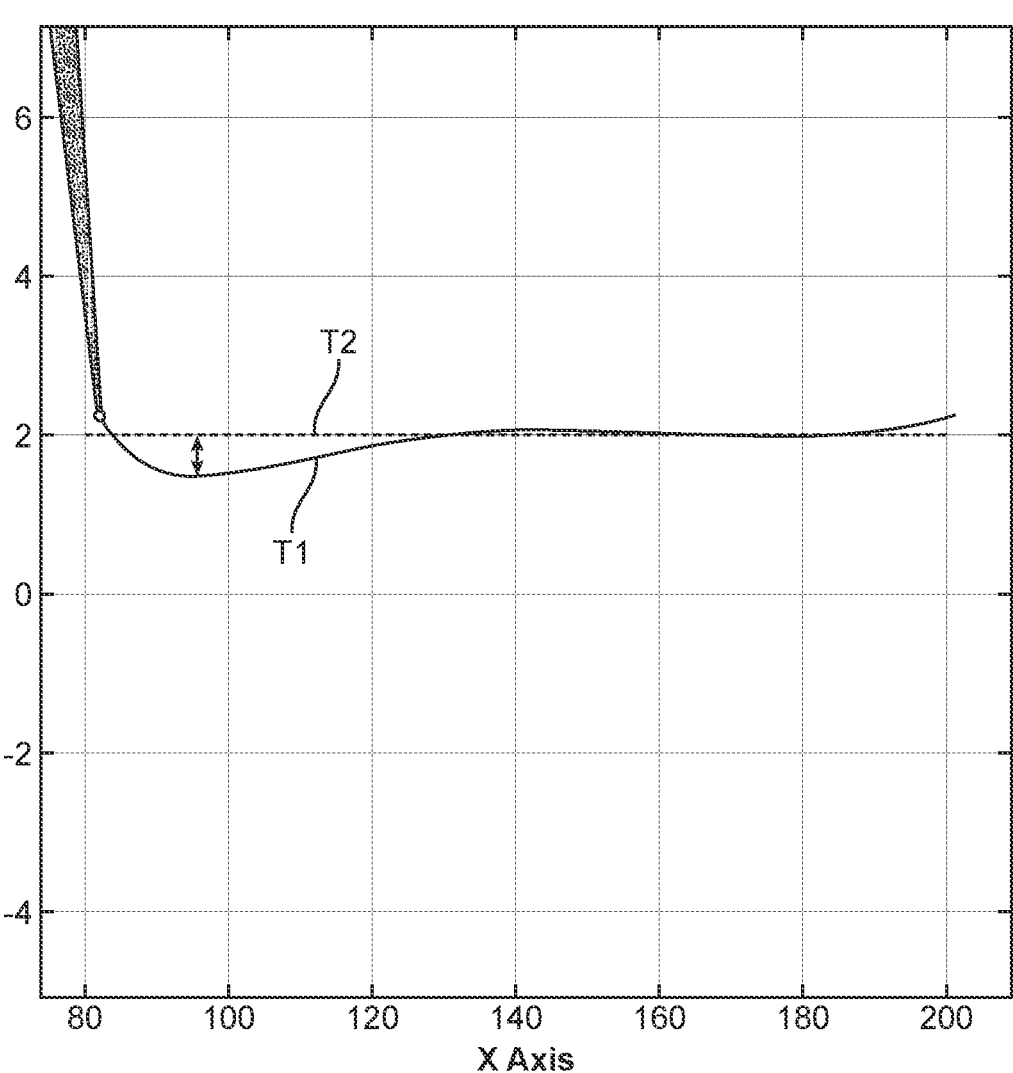
FIG. 3 is a graph of the track followed by the miter saw according to the present invention.

The cutting assembly 134 is coupled to the table 118 by a linkage assembly 200. The linkage assembly 200 is configured such that the cutting assembly 134 is movable relative to the table 118 in a slide direction between the forward position P1 and the rearward position P2, with the forward position P1 being closer to the operator than the rearward position P2. As illustrated in FIG. 3, the cutting assembly 134 follows a generally linear, horizontal path between the forward position P1 and the rearward position P2. The cutting assembly 134 follows a track T1 with minimal deviation from the generally horizontal track T2, which is the linear path followed by the cutting assembly 28 of the prior art miter saw 20.

The linkage assembly 200 includes a first link 204, a second link 208, and a floating link 212. The first link 204 has a first end 216 that is pivotally coupled to the bevel arm 126 and an opposite, second end 220, that is pivotally coupled to the floating link 212 and is pivotable about a rotational axis (similar to rotational axis A3 shown in FIG. 4A). The first end 216 of the first link 204 may instead be coupled to the table 118. The second link 208 has a first end 224 that is pivotally coupled to the bevel arm 126, and an opposite, second end 228 that is pivotally coupled to the floating link 212 and is pivotable about a rotational axis (similar to rotational axis A4 shown in FIG. 4A). The first end 224 of the second link 208 may instead be coupled to the table 118. The cutting assembly 134 is pivotally coupled to the floating link 212 at the first end 232 of the floating link 212. The cutting assembly 134 is pivotable about a rotational axis (similar to rotational axis A5 shown in FIG. 4A) between a raised position where the saw blade 146 is in a spaced relation to the table 118, and a lowered position where the saw blade 146 is proximate the table 118 and in which at least a portion of the saw blade 146 extends through a slot (not pictured) defined in the table 118. The rotational axes are substantially parallel to one another. The second end 220 of the first link 204 is pivotally coupled to the floating link 212 at the second end 236 of the floating link 212. The second end 228 of the second link 208 is pivotally coupled to the floating link 212 between the first end 232 and the second end 236 of the floating link 212. As illustrated in FIG. 2, the second link 208 is pivotally coupled to the floating link 212 closer to the second end 236 of the floating link 212 than to the first end 232. In other embodiments, for instance, the embodiments of FIGS. 1A and 1B, the second link 208 is coupled to the floating link 212 at other positions between the first and second ends 232, 236 of the floating link 212. The first, second, and floating links may be metal, rigid plastic, or other suitably durable material and may be formed by any appropriate process, including casting, forging, stamping, machining, etc.

FIGS. 4A-6B illustrate other embodiments of miter saws 10 with a linkage assembly 300 according to the invention. Identical reference numerals are used for similar parts of the embodiment of the linkage assembly 300, with the reference numerals for similar parts of the embodiments of FIGS. 4A-6B beginning with a "300." The linkage assembly 300 includes a first link 304, a second link 308, and a floating link 312, to which a cutting assembly 134 is coupled. The first link 304 is pivotably coupled to the floating link 312 and is pivotable about a rotational axis A3. The second link 308 is also pivotably coupled to the floating link 312 and is pivotable about a rotational axis A4. The cutting assembly 134 (represented in FIGS. 4A-6B as a cutting assembly link illustrating the profile of a cutting assembly) is coupled to the floating link 312 and is pivotable relative to the floating link 312 about a rotational axis A5.

Each of the first link 304, the second link 308, and the floating link 312 is a link pair. That is, the first link 304 includes a left first link 304a and a right first link 304b, with the left and right first links 304a, 304b positioned on opposite sides of the cutting plane Cl defined by and including the side surface 150 of the saw blade 146. The second link 308 includes a left second link 308a and a right second link 308b positioned on opposites sides of the cutting plane Cl. The floating link 312 includes a left floating link 312a and a right floating link 312b positioned on opposite sides of the cutting plane Cl. As illustrated in FIGS. 4A-6B, the left first link 304a and right first link 304b are coupled to the bevel arm 126 such that the bevel arm 126 is positioned between the left first link 304a and right first link 304b. The left second link 308a and right second link 308b are similarly coupled to the bevel arm 126 with the bevel arm 126 positioned between the left second link 308a and right second link 308b. The left floating link 312a and right floating link 312b are positioned such that the left first link 304a and the right first link 304b, and the left second link 308a and right second link 308b are positioned between the left floating link 312a and right floating link 312b. Spacers 350, shown in FIG. 6B, are coupled between the second end 320a of the left first link 304a and the second end 320b of the right first link 304b, and between the second end 328a of the left second link 308a and the second end 328b of the right second link 308b.

Figure 4A:
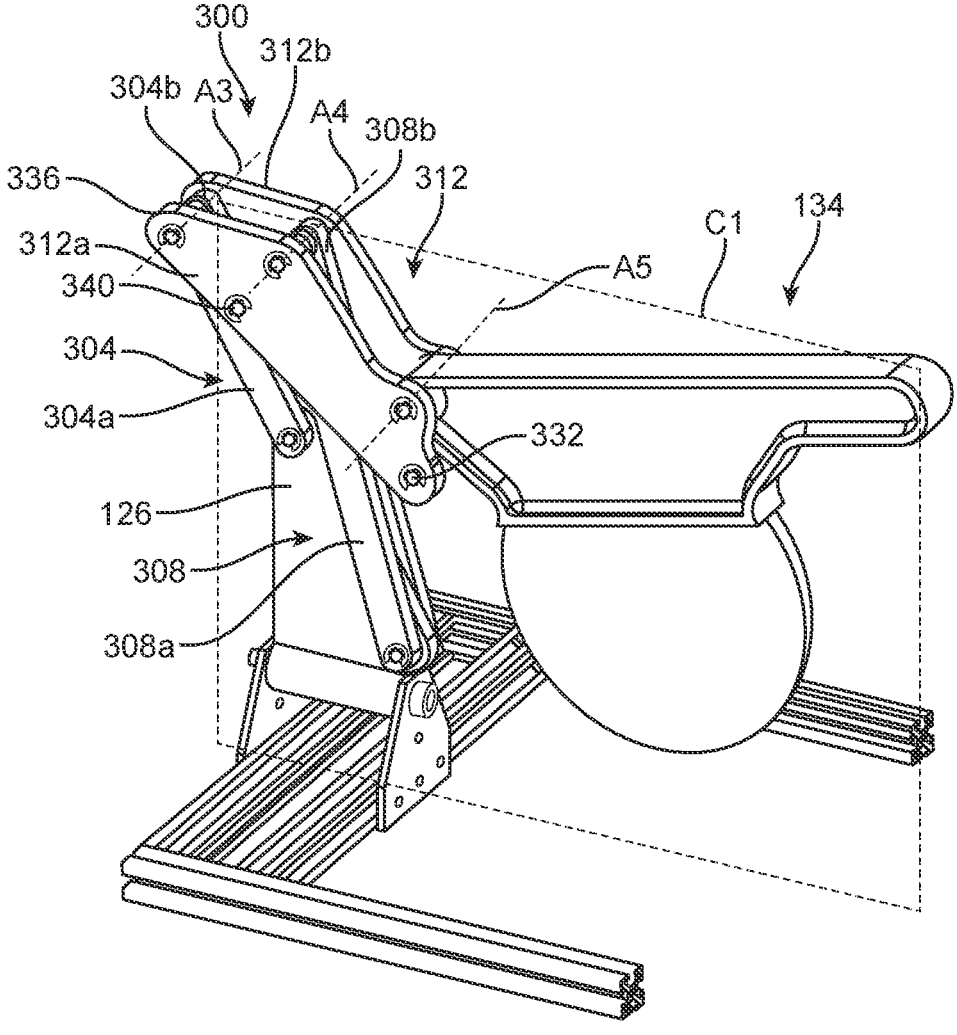
FIG. 4A is a perspective view of another embodiment of a miter saw according to the present invention.
Figure 4B:
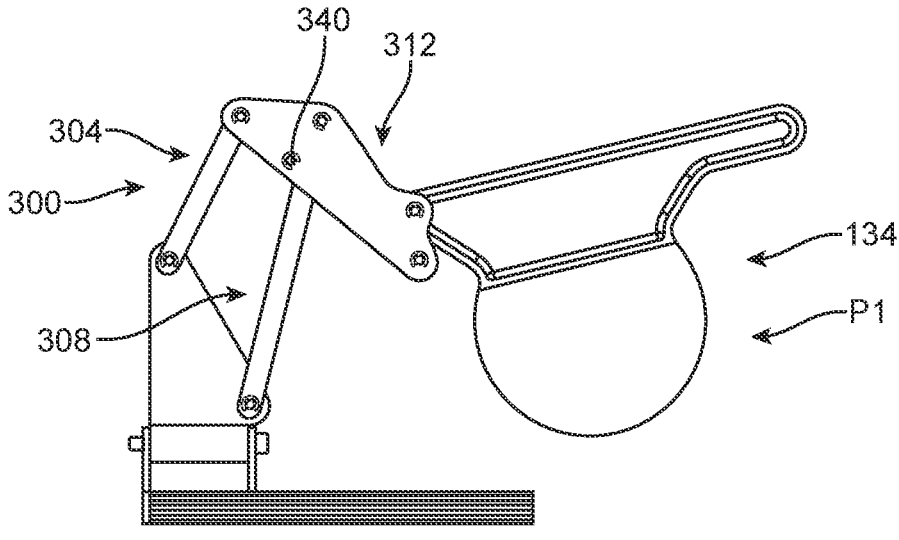
FIG. 4B is a side view of a miter saw according to FIG. 4A.
Figure 4C:
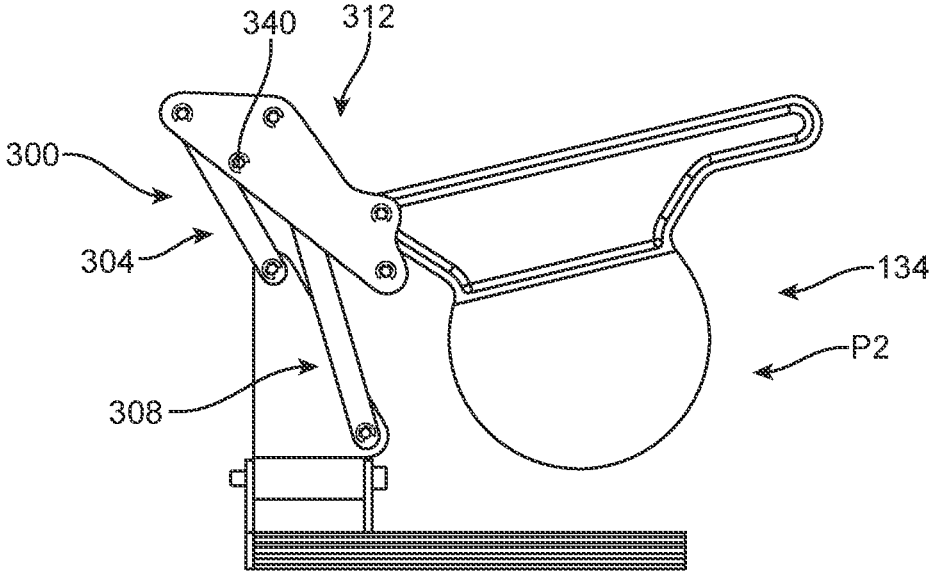
FIG. 4C is a side view of a miter saw according to FIG. 4A.
Figures 5A, 5B, 5C:
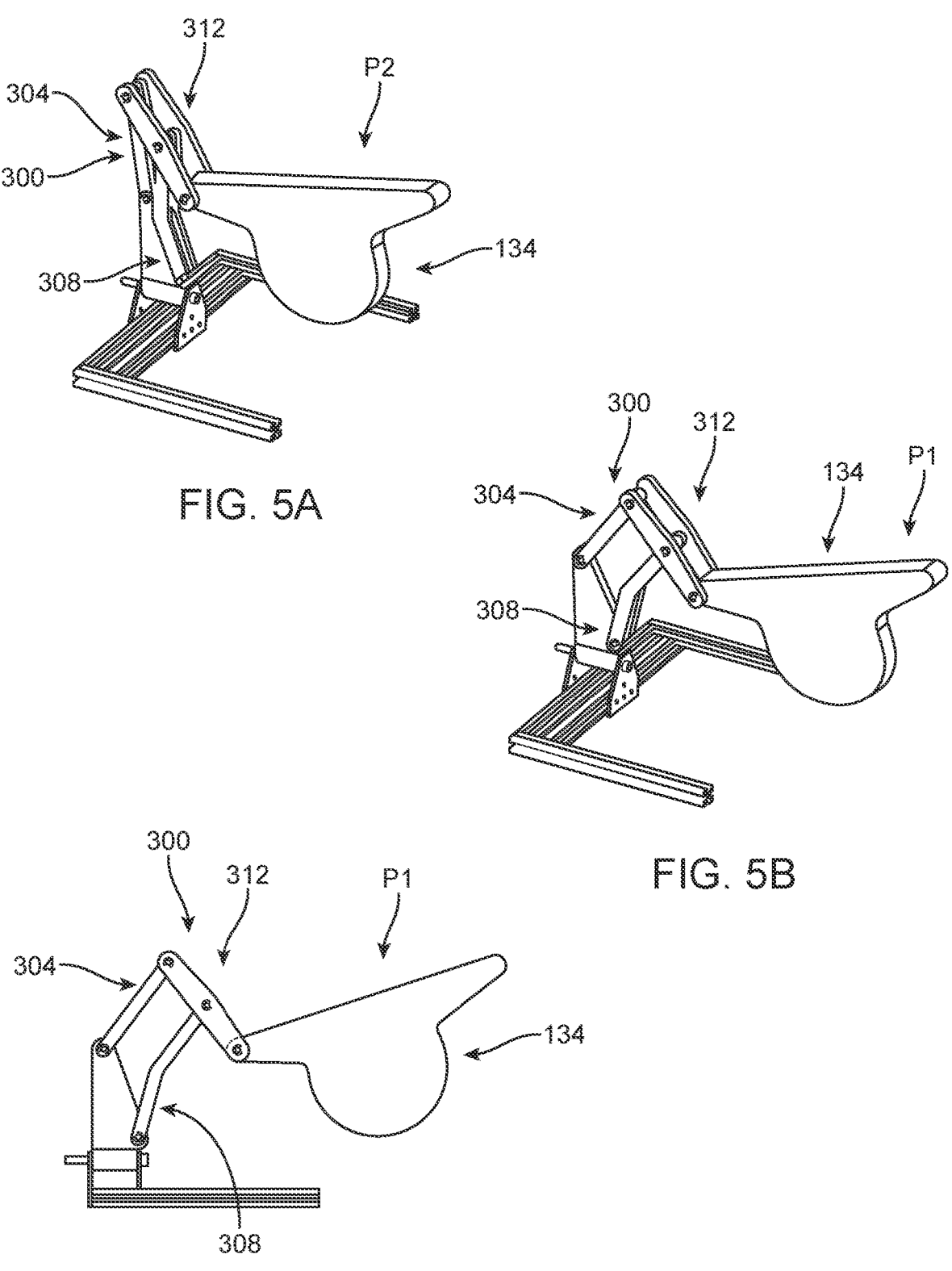
FIG. 5A is a perspective view of another embodiment of a miter saw according to the present invention.
FIG. 5B is a perspective view of a miter saw according to FIG. 5A.
FIG. 5C is a perspective view of a miter saw according to FIG. 5A.

As shown in the various embodiments of FIG. 2 and FIGS. 4A-6B, the first end 216 of the first link 204 is coupled to the bevel arm 126 in a position upward and rearward from the location at which the first end 224 of the second link 208 is coupled to the bevel arm 126. The first end 224 of the second link 208 is coupled to the bevel arm 126 adjacent the location at which the bevel arm 126 is pivotally coupled to the table 118. FIG. 2 and FIGS. 4A-6B illustrate various embodiments of the first link 204, second link 208, and floating link 212. FIG. 2 illustrates embodiments of the first link 204, second link 208, and floating link 212 each having a generally linear profile. FIGS. 4A-4C illustrate an embodiment of the miter saw 10 with the left first link 304a, right first link 304b, left second link 308a, and right second link 308b having a generally linear profile and the left floating link 312a and right floating link 312b having an irregular profile. FIGS. 5A-6B illustrate embodiments of the miter saw 10 with the left first link 304a and right first link 304b having a generally linear profile, the left second link 308a and right second link 308b having an angled profile, and the left floating link 312a and right floating link 312b having a generally linear profile. As will be appreciated by one skilled in the art, the profile of the first, second and floating links of the various embodiments may depend on various considerations including, but not limited to, dimensional considerations of the miter saw, durability of components, fit of individual components of the assembly, cost, ease of manufacturing, etc.

Figure 6A:
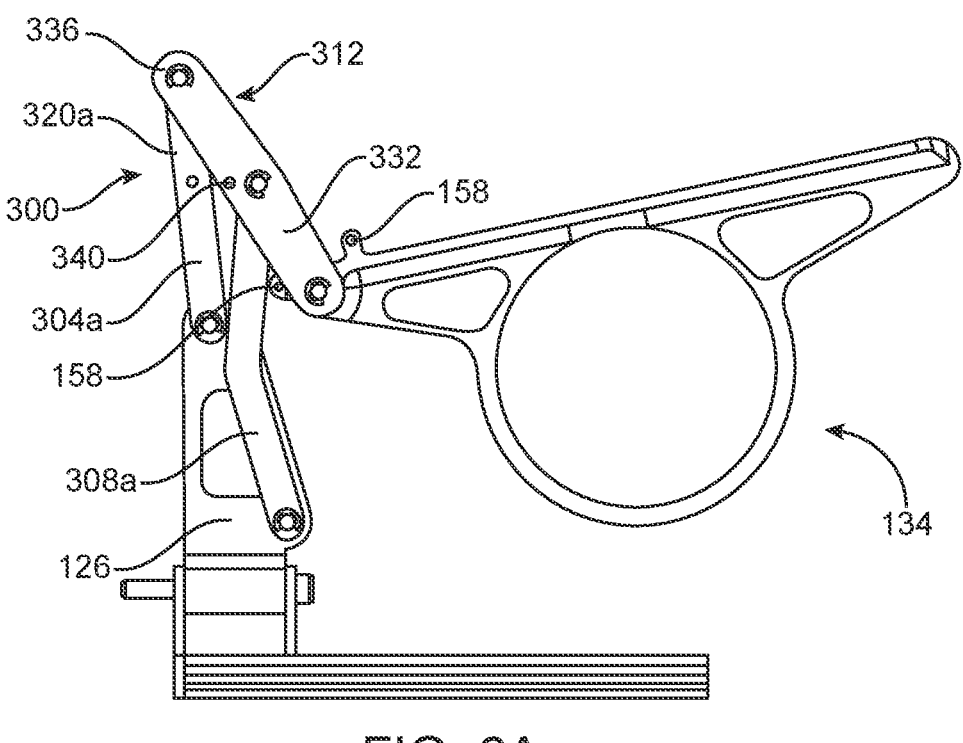
FIG. 6A is a side view of another embodiment of a miter saw according to the present invention.
Figure 6B:
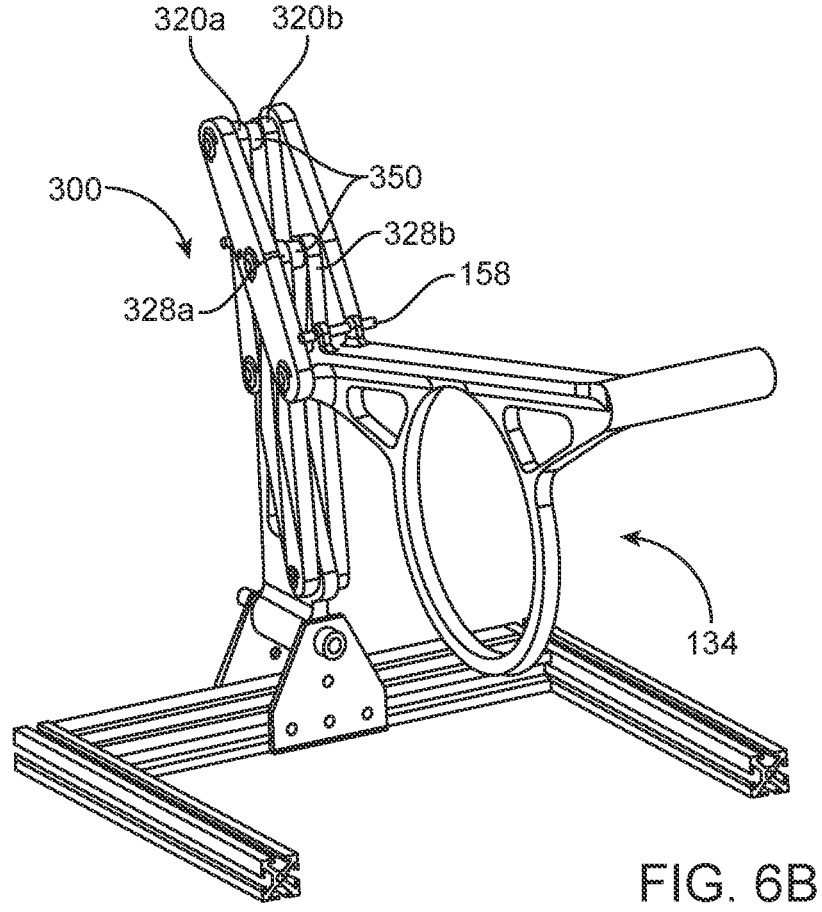
FIG. 6B is a perspective view of a miter saw according to FIG. 6A.

As illustrated in FIG. 6A, the cutting assembly 134 includes a plurality of rotational stops 158. The rotational stops 158 may be coupled to the housing 138 or may instead be formed integrally with the housing 138. The rotational stops 158 engage the floating link 312, thereby preventing rotation of the cutting assembly 134 beyond the raised position or the lowered position.

With references to FIGS. 4A-4C and 6A, the linkage assembly 300 includes a slide stop 340 coupled to the floating link 312 between the first end 332 and the second end 336 of the floating link 312. The slide stop 340 alternatively engages the first link 304 and the second link 308 when the cutting assembly 134 is positioned at the rearward position P2 or at the forward position P1, respectively, thereby preventing the cutting assembly 134 from sliding forward or rearward beyond the forward position P1 and the rearward position P2. The slide stop 340 may be formed integrally with or separately from the floating link 312.

The miter saw 10 also includes a locking assembly (not shown). The locking assembly engages the linkage assembly 200 and maintains the position of the cutting assembly 134 between the forward position P1 and the rearward position P2. The locking assembly may be coupled to the bevel arm 126 and engage the first link 204, the second link 208, or the floating link 212. The locking assembly may instead by coupled to one of the first link 204, second link 208, or floating link 212, and engage another of the first link 204, second link 208, or floating link 212.

Figure 7A:
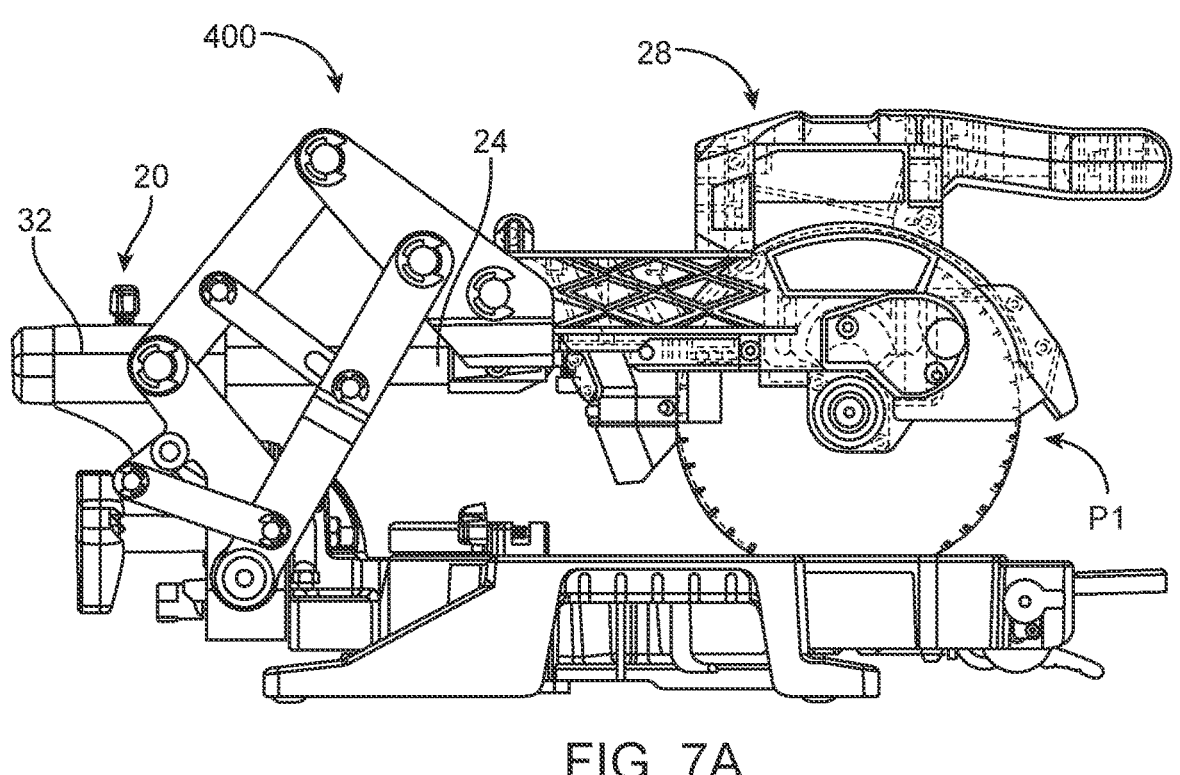
FIG. 7A is a side view of a miter saw according to the present invention overlaying a prior art miter saw.
Figure 7B:
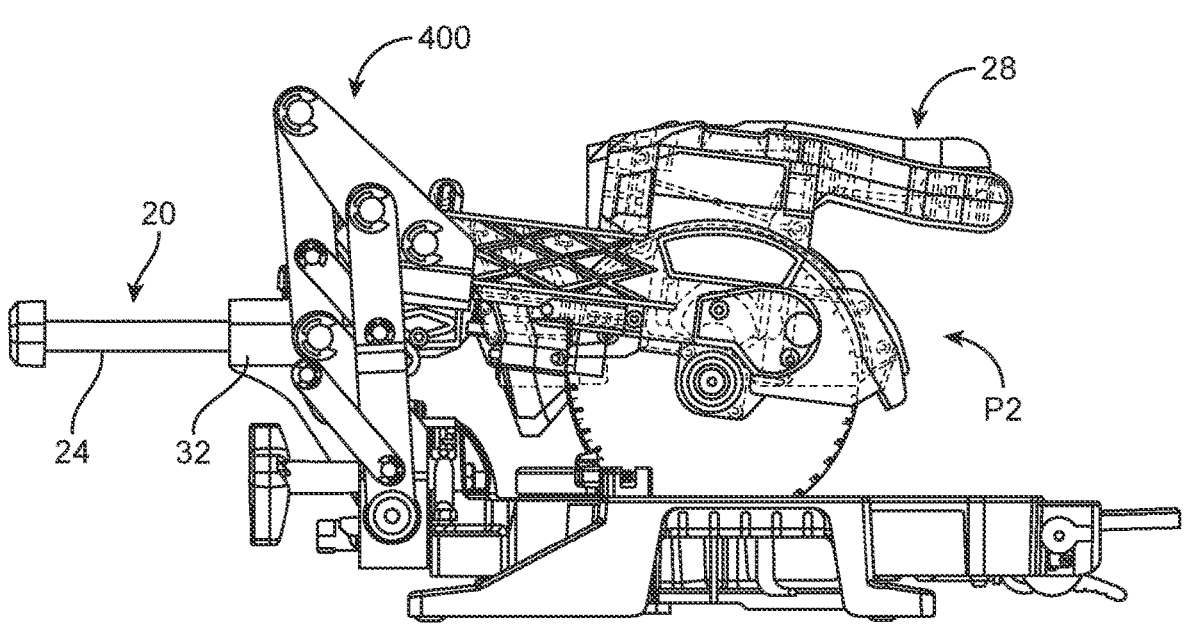
FIG. 7B is a side view of a miter saw according to the present invention overlaying a prior art miter saw.

FIGS. 7A and 7B illustrate a miter saw 400 according to another embodiment of the invention in comparison to a prior art miter saw 20. The prior art miter saw 20 includes a pair of slide members 24 coupled to a cutting assembly 28.

The slide members 24 extend through a bevel arm 32 in a rearward direction of the prior art miter saw 20. FIG. 7A illustrates the miter saws 20, 400 in a forward position P1. FIG. 7B illustrates the miter saws 20, 400 in a rearward position P2.

Figure 8:
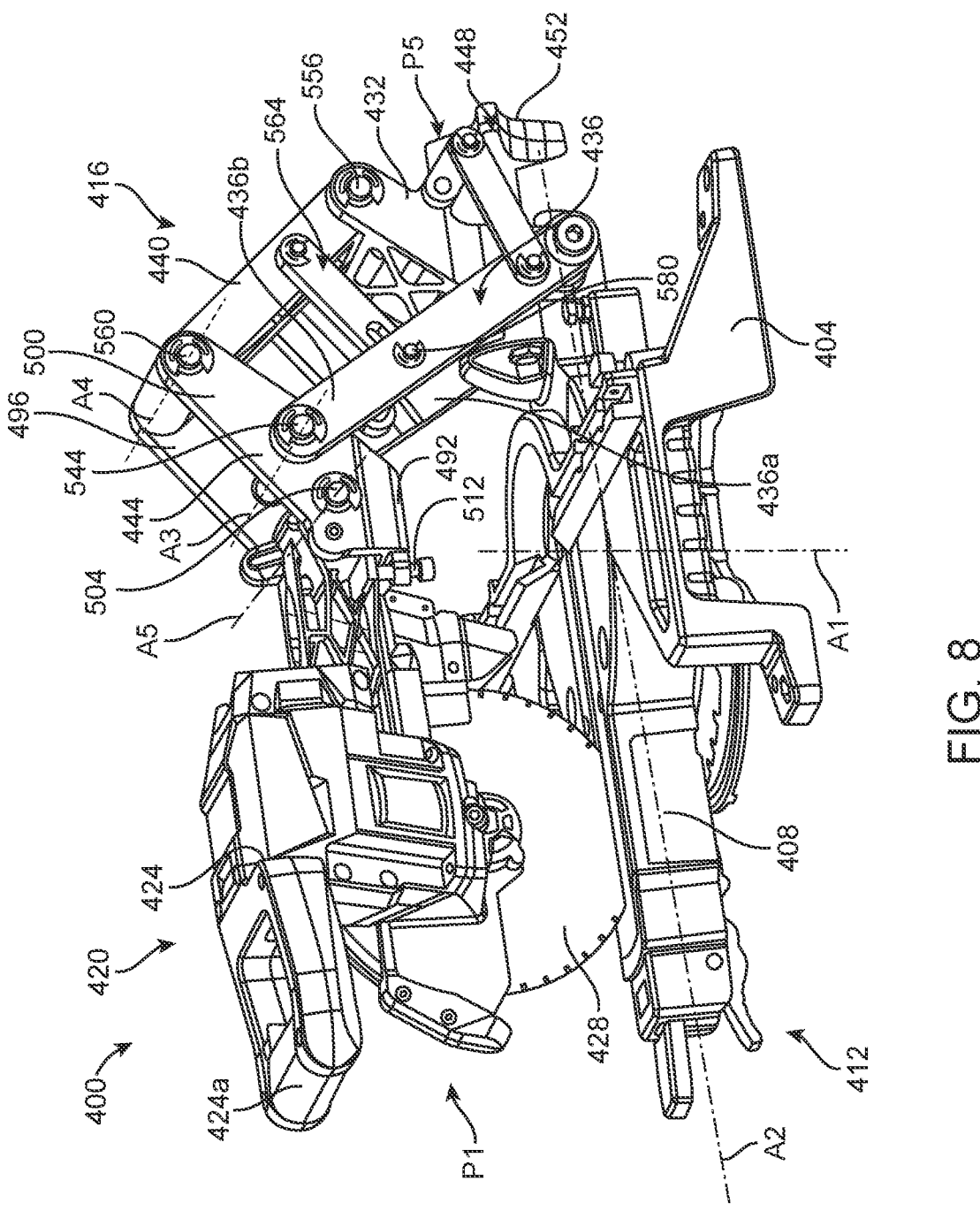
FIG. 8 is a perspective view of a miter saw according to the present invention.

FIG. 8 illustrates the embodiment of the miter saw 400 alone. The miter saw 400 has a base 404 and a table 408 that is pivotally coupled to the base 404. The table 408 pivots relative to the base 404 about a miter axis A1 that is generally vertical. The table 408 may include adjustment features 412 (e.g. miter angle lock, miter angle detents configured to delimit common miter angles, etc.) configured to adjust the miter angle of a cutting operation. A linkage assembly 416 is coupled to the table 408 and is pivotable relative to the table 408 about a bevel axis A2, or ground axis. The bevel axis A2 is generally perpendicular to the miter axis A1. A cutting assembly 420 (similar to any of the other previous embodiments of cutting assemblies 32, 134) is pivotally coupled to the linkage assembly 416. The cutting assembly 420 is pivotable about a cutting axis A3 between a raised position (not shown) and a lowered position P3. The cutting axis A3 is generally perpendicular to the miter axis A1 and bevel axis A2. The cutting assembly 420 includes a housing 424 that supports a motor (not shown) that is operationally coupled to a saw blade 428.

With continued reference to FIG. 8, the linkage assembly 416 includes a bevel arm or ground link 432, a first linkage 436, a second linkage 440, and a floating link 444. The ground link 432 is pivotally coupled to the table 408 and pivotable relative to the table 408 about the bevel axis A2. As shown in FIG. 8, a bevel lock mechanism 448, including a bevel lock knob 452, is coupled to the table 408. The bevel lock mechanism 448 extends through a slot 456 in the ground link 432 and engages the ground link 432 to fix the angular position of the ground link 432 relative to the table 408. Other bevel adjustment features (e.g., bevel angle detents which delimit common bevel angles) may alternatively, or additionally, be included.

Figure 10A:
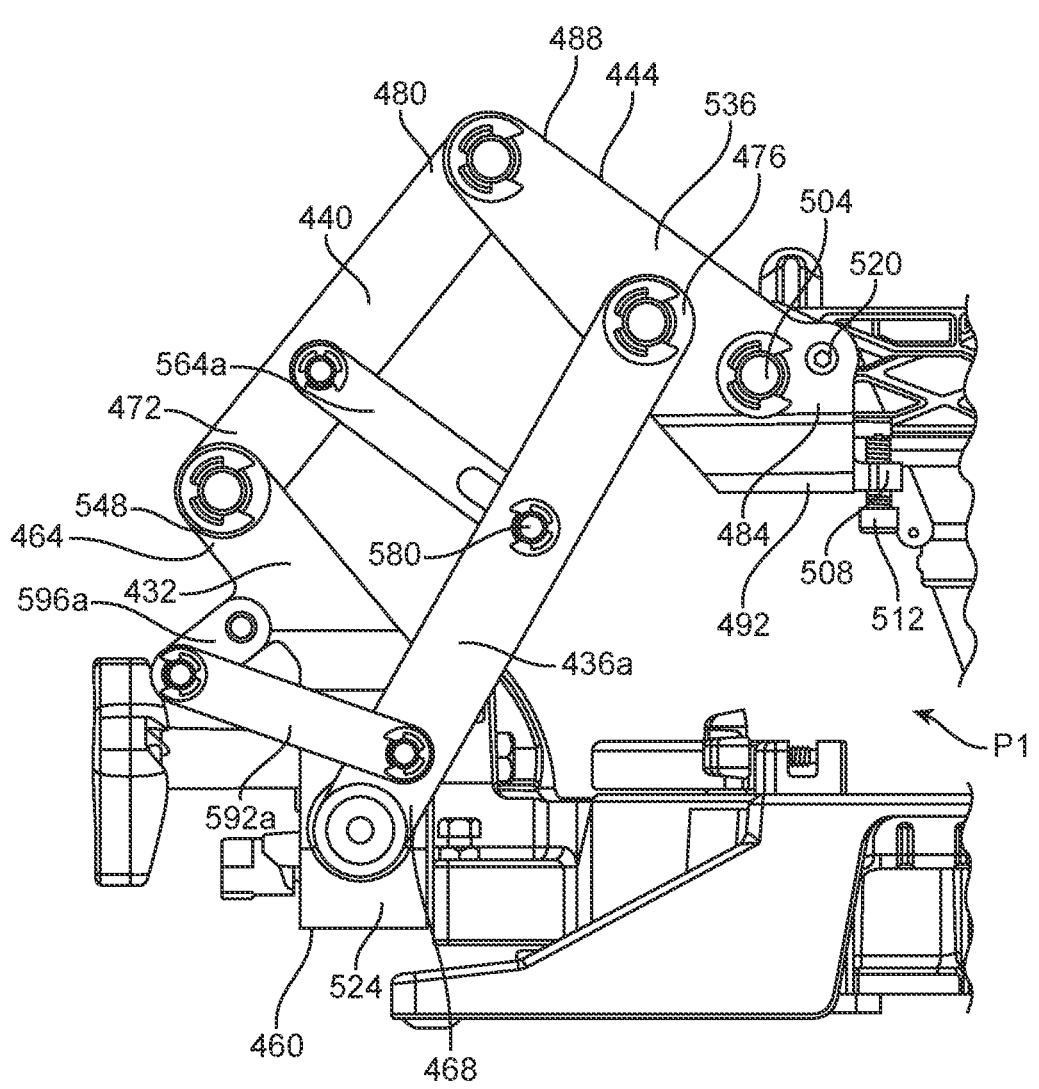
FIG. 10A is a side view of the miter saw according to FIG. 8.
Figure 10B:
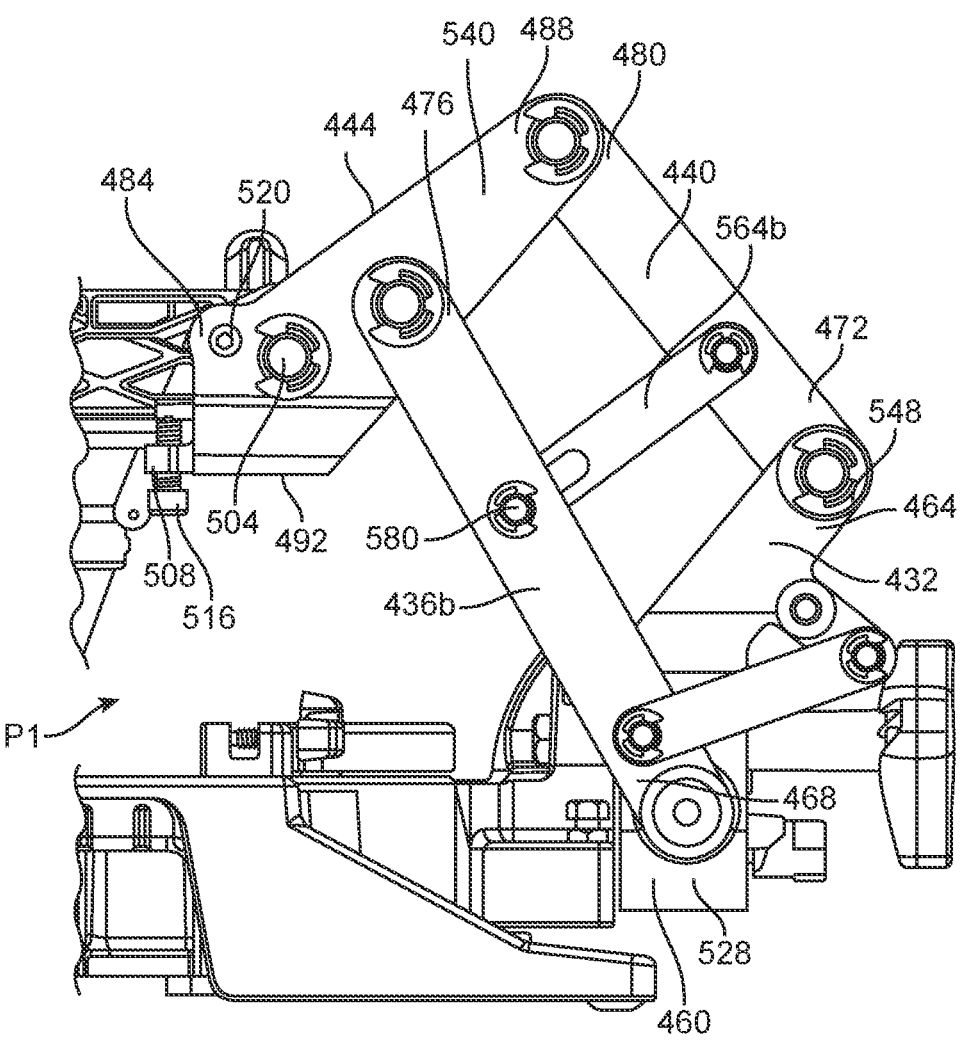
FIG. 10B is a side view of the miter saw according to FIG. 8.

With reference to FIGS. 8 and 10A-10B, the ground link 432 extends from a first end 460 that is proximate the table 408 to a second end 464 that is spaced apart from the table 408 in a direction that is generally upward and away from the table 408. A first end 468 of the first linkage 436 is pivotally coupled to the first end 460 of the ground link 432 and a first end 472 of the second linkage 440 is pivotally coupled to the second end 464 of the ground link 432.

The cutting assembly 420 is pivotally coupled to the floating link 444 at a first end 484 of the floating link 444 and is pivotable about a rotational axis A5. The second end 476 of the first linkage 436 and the second end 480 of the second linkage 440 are pivotally coupled to the floating link 444. That is, the second end 480 of the second linkage 440 is pivotally coupled to the floating link 444 at a second end 488 of the floating link 444 and is pivotable about a rotational axis A4. The second end 476 of the first linkage 436 is pivotally coupled to the floating link 444 between the first and second ends 484, 488 of the floating link 444 and is pivotable about a rotational axis A3. The floating link 444 has a central portion 492 and first and second flanges 496, 500 that extend from the central portion 492, from the first end 484 to the second end 488. The cutting assembly 420 is positioned between and pivotally coupled to the first and second flanges 496, 500 by a cutting shaft 504. A tab 508 extends from the central portion 492 of the floating link 444 toward the cutting assembly 420. A stop 512 is coupled to the tab 508 and engages the cutting assembly 420 to define a lowermost position P4 of the cutting assembly 420. The stop 512 is adjustable to define the lowermost position P4 as a result of user input. In the illustrated embodiment, the stop 512 is a fastener 516 engaged in the tab 508 by threaded engagement and rotatable relative to the tab 508 for the user to define the lowermost position P4. With reference to FIGS. 10A-11B, a rotation lock 520 may be coupled to the floating link 444 and selectively engaged the cutting assembly 420. By engaging the rotation lock 520 with the cutting assembly 420, the cutting assembly 420 can be maintained at the raised position (not shown), the lowered position P3, or a position between the raised position P3 and lowered positions (not shown).

With continued reference to FIGS. 10A-10B, the first linkage 436 includes a left link 436a and a right link 436b. The left and right links 436a, 436b each have a first end 468 and a second end 476. The first end 468 of the left link 436a is coupled to a left side 524 of the ground link 432 and the first end 468 of the right link 436b is coupled to a right side 528 of the ground link 432, for instance, at bosses 532 extending from the left and right sides 524, 528 of the ground link 432. The second end 476 of the left link 436a is coupled to a left side 536 of the first flange 496 of the floating link 444 and the second end 476 of the right link 436b is coupled to the right side 540 of the second flange 500 of the floating link 444. The left and right links 436a, 436b are pivotably coupled to the floating link 444 by a first linkage shaft 544 that extends through the left and right links 436a, 436b and the floating link 444.

The second linkage 440 is illustrated as a single link. The second linkage 440 may instead include multiple links. The first end 472 of the second linkage 440 is pivotally coupled to the ground link 432 between first and second flanges 548, 552 extending from the second end 464 of the ground link 432 by a second ground shaft 556 extending through the ground link 432 and the second linkage 440. The second end 480 of the second linkage 440 is pivotally coupled to the floating link 444 between the first and second flanges 496, 500 by a second linkage shaft 560 that extends through the first and second flanges 496, 500 and the second linkage 440.

Figure 11:
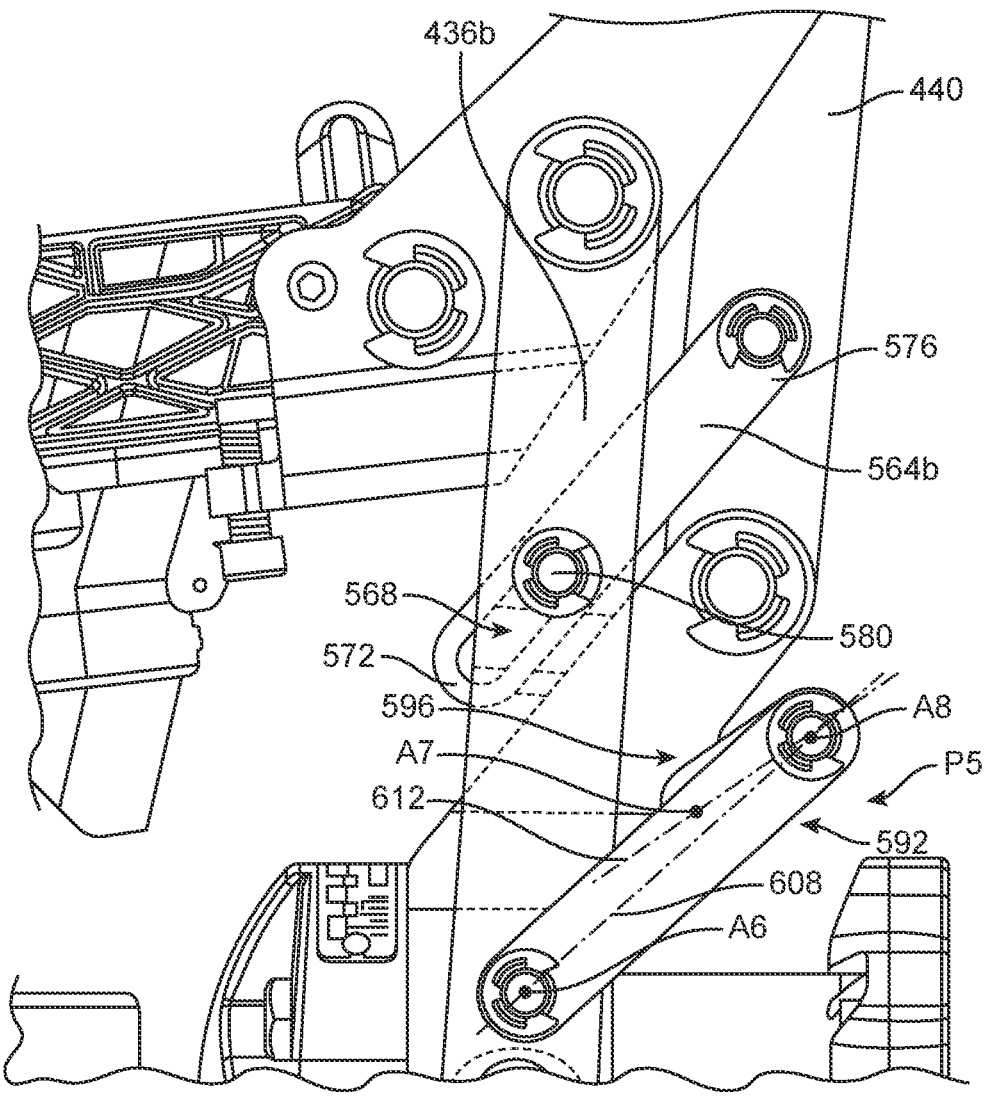
FIG. 11 is a side view of the miter saw according to FIG. 8.
Figure 12:
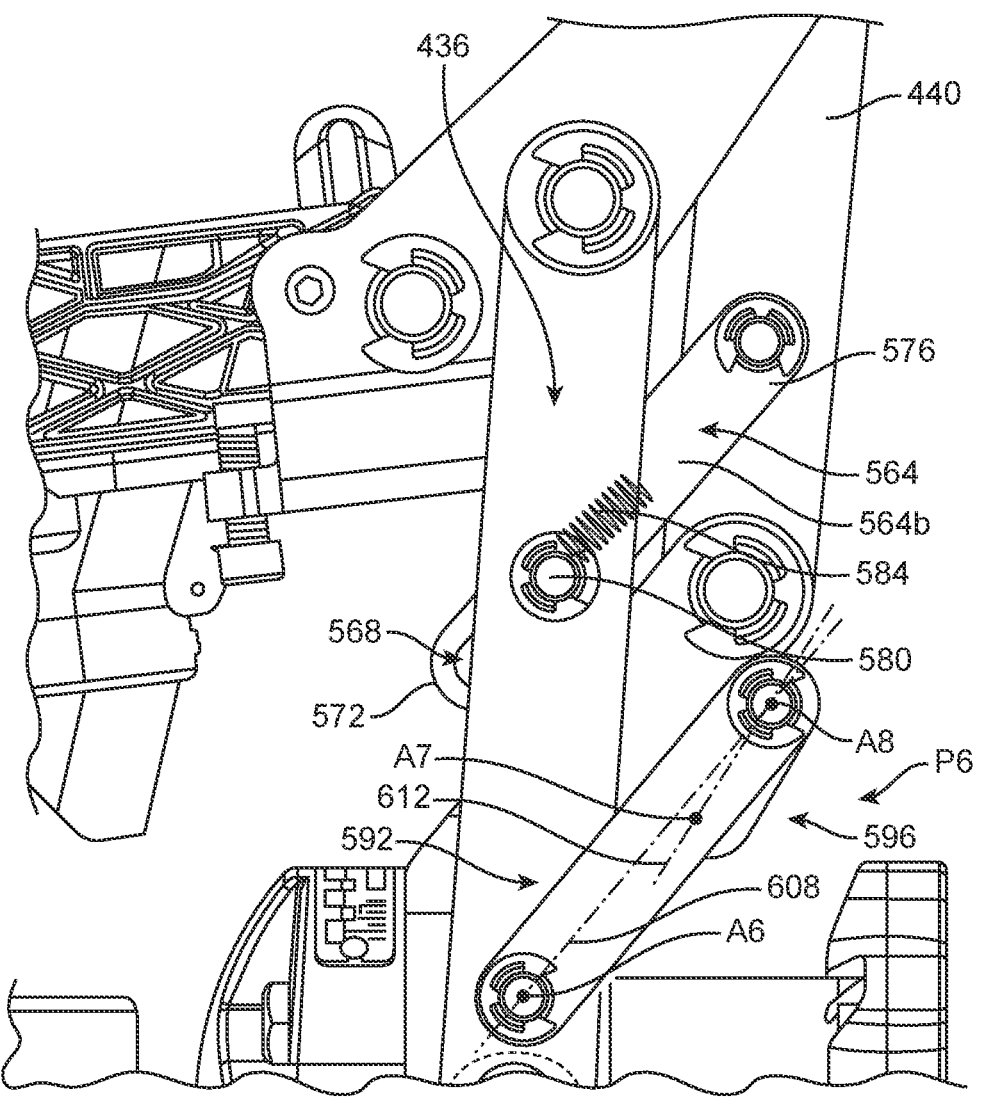
FIG. 12 is a side view of another embodiment of a miter saw according to FIG. 8.

Returning to FIG. 8, the linkage assembly 416 also includes a travel stop mechanism 564. The travel stop mechanism 564 is slidingly coupled to the first linkage 436 between the first and second ends 468, 476 of the first linkage 436 and pivotally coupled to the second linkage 440 between the first and second ends 472, 480 of the second linkage 440. As illustrated in FIGS. 10A-10B and 11, the travel stop mechanism 564 includes a left link 564a and a right link 564b. The left link 564a is slidingly coupled to the left link 436a of the first linkage 436 and the right link 564b is slidingly coupled to the right link 436b of the first linkage 436. Each of the left and right links 564a, 564b includes a slot 568 beginning at a first end 572 and extending at least partially along the length of the left and right links 564a, 564b toward the second end 576 of the left and right links 564a, 564b. The slot 568 extends through the width of the left and right links 564a, 564b. A travel stop shaft 580 extends through the left and right links 436a, 436b of the first linkage 436 and the slots 568 of the left and right links 564a, 564b of the travel stop mechanism 564. With reference to FIG. 12, the travel stop mechanism 564 may include one or more biasing members (e.g., springs 584) coupled to the first linkage 436 and the left and/or right links 564a, 564b of the travel stop mechanism 564. In the illustrated embodiment, the spring 584 is coupled to the right link 564b between the first and second ends 572, 576. The spring 584 is also coupled to the travel stop shaft 580. The spring 584 may instead by coupled to the first linkage 436. The spring

584 imparts a biasing force on the first linkage 436 to bias the first linkage 436 toward the second end 576 of the left and right links 564a, 564b of the travel stop mechanism 564, and thereby, biasing the cutting assembly to the second position P2 away from the user.

The cutting assembly 420 is slidable between the forward position P1 and the rearward position P2 along a path that is generally linear, and which is substantially perpendicular to the rotational axes A6, A7, and A8. As the user pulls the handle 424a extending from the housing 424 toward the user, the cutting assembly 420 slides toward the user. As the cutting assembly 420 slides relative to the user, the first and second linkages 436, 440 pivot relative to the ground link 432 and the floating link 444. When the cutting assembly 420 has reached the forward position P1, the travel stop shaft 580 disposed in the slots 568 of the left and right links 564a, 564b of the travel stop mechanism 564 engages the left and right links 564a, 564b and prevents the cutting assembly 420 from sliding beyond the forward position P1. The spring 584 imparts a biasing force on the first linkage 436 biasing the first linkage 436, and thereby the cutting assembly 420, toward the rearward position P2.

Figure 9:
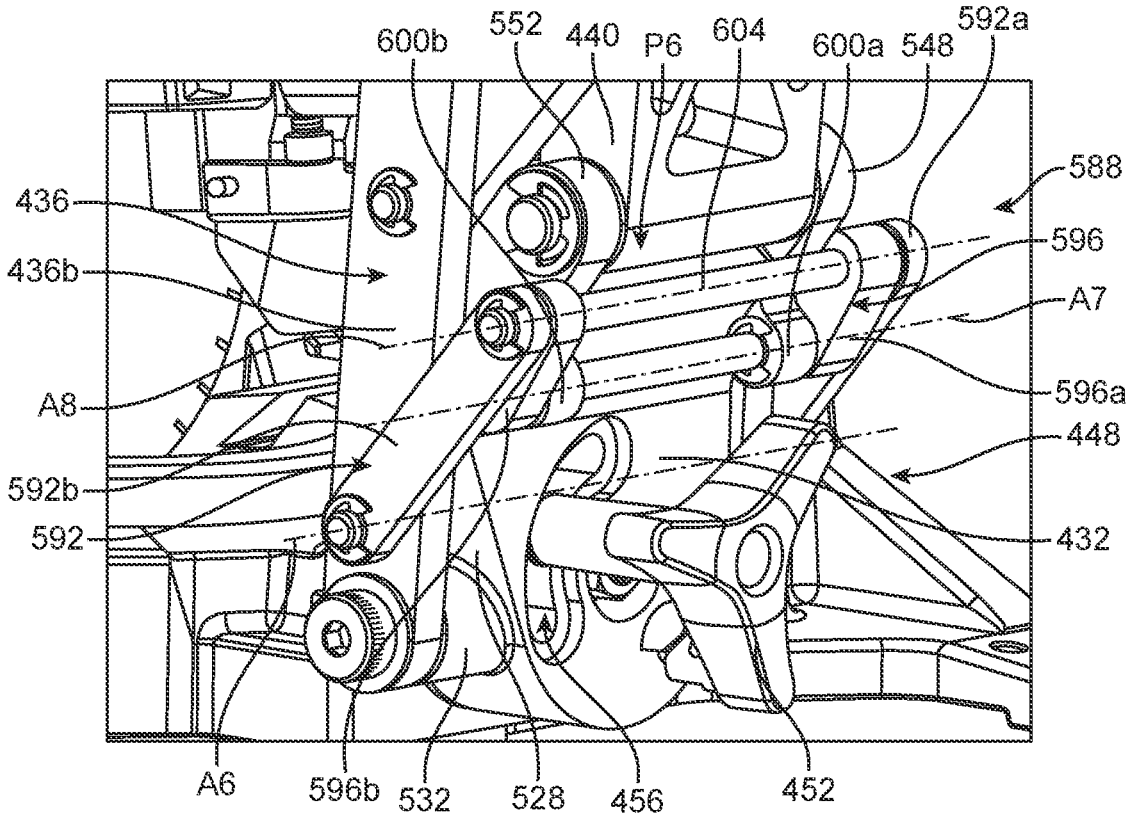
FIG. 9 is a perspective view of the miter saw according to FIG. 8.

Returning to FIG. 9, the linkage assembly 416 also includes a slide locking mechanism 588. The slide locking mechanism 588 has a first linkage pair 592 pivotally coupled to a second linkage pair 596. The first linkage pair 592 is pivotally coupled to the first linkage 436 adjacent the first end 468 of the first linkage 436. The first linkage pair 592 pivots relative to the first linkage 436 about a first linkage axis A6. The second linkage pair 596 is pivotally coupled to tabs 600, such as a left tab 600a and a right tab 600b, extending from the ground link 432 between the first and second end 460, 464. The second linkage pair 596 is pivotable relative to the ground link 432 about a second linkage axis A7. The first linkage pair 592 includes a left link 592a pivotally coupled to the left link 436a of the first linkage 436 and a right link 592b coupled to the right link 436b of the first linkage 436. The second linkage pair 596 includes left and right links 596a, 596b. The left link 596a is pivotally coupled to the left link 592a of the first linkage pair 592 and the left tab 600a extending from ground link 432 and the right link 596b is pivotally coupled to the right link 592b of the first linkage pair 592 and the right tab 600b. The first linkage pair 592 and second linkage pair 596 are pivotally coupled by a locking shaft 604 that has a locking shaft axis A8. The locking shaft 604 extends through the first and second linkage pairs 592, 596.

The locking shaft 604 can be moved between the unlocked position P5 (FIG. 11) and the locked position P6 (FIG. 12) when the cutting assembly 420 is in the rearward position P2. When the locking shaft 604 is in the unlocked position P5 (FIG. 11), the locking shaft axis A8 is below the second linkage axis A7. When the locking shaft 604 is the locked position P6 (FIG. 12), the locking shaft axis A8 is above the second linkage axis A7. In that regard, the first linkage pair 592 defines a first line of action 608 extending along the first linkage pair 592 between the first linkage axis A6 and the locking shaft axis A8, and the second linkage pair 596 defines a second line of action 612 extending along the second linkage pair 596 between the second linkage axis A7 and the locking shaft axis A8. In some embodiments, the biasing member 584 may be a compression spring that is coupled to the second link 436 and the travel stop mechanism 564 and biases the cutting assembly 420 toward the first position P1, closer to the user. When the locking shaft 604 is moved to the locked position P6, the biasing member 584 biases the locking shaft 604 into contact with the ground link 432, preventing motion of the cutting assembly 420 and locking the cutting assembly 420 at the second position P2.

As illustrated in FIG. 11, when the slide locking mechanism 588 is in the unlocked position P5 and the locking shaft axis A8 is below the second linkage axis A7, the first line of action 608 is below the second line of action 612, as viewed when looking at the miter saw 400 positioned on a work surface. When a user pulls the handle 424a to move the cutting assembly 420 to the forward position P1, the first linkage 436 pivots in a counterclockwise direction as viewed in FIG. 11, thus imparting a force along the first line of action 608 and resulting in the second linkage pair 596 pivoting in a clockwise direction about the second linkage axis A7 away from the ground link 432, as viewed in FIG. 11.

As illustrated in FIG. 12, when the slide locking mechanism 588 is in the locked position P6 with the locking shaft axis A8 positioned above the second linkage axis A7, the first line of action 608 is above the second line of action 612, as viewed when looking at the miter saw 400 positioned on a work surface. When a user pulls the handle 424a to move the cutting assembly 420 to the forward position P1, the first linkage 436 pivots in a counterclockwise direction as viewed in FIG. 12 and imparts a force along the first line of action 608. The force along the first line of action 608 results in the second linkage pair 596 pivoting in a counterclockwise direction about the second linkage axis A7 toward the ground link 432, as viewed in FIG. 12, and the locking shaft 604 contacts and engages the ground link 432 thereby preventing sliding of the cutting assembly 420 toward the forward position P1.

Figure 13A:
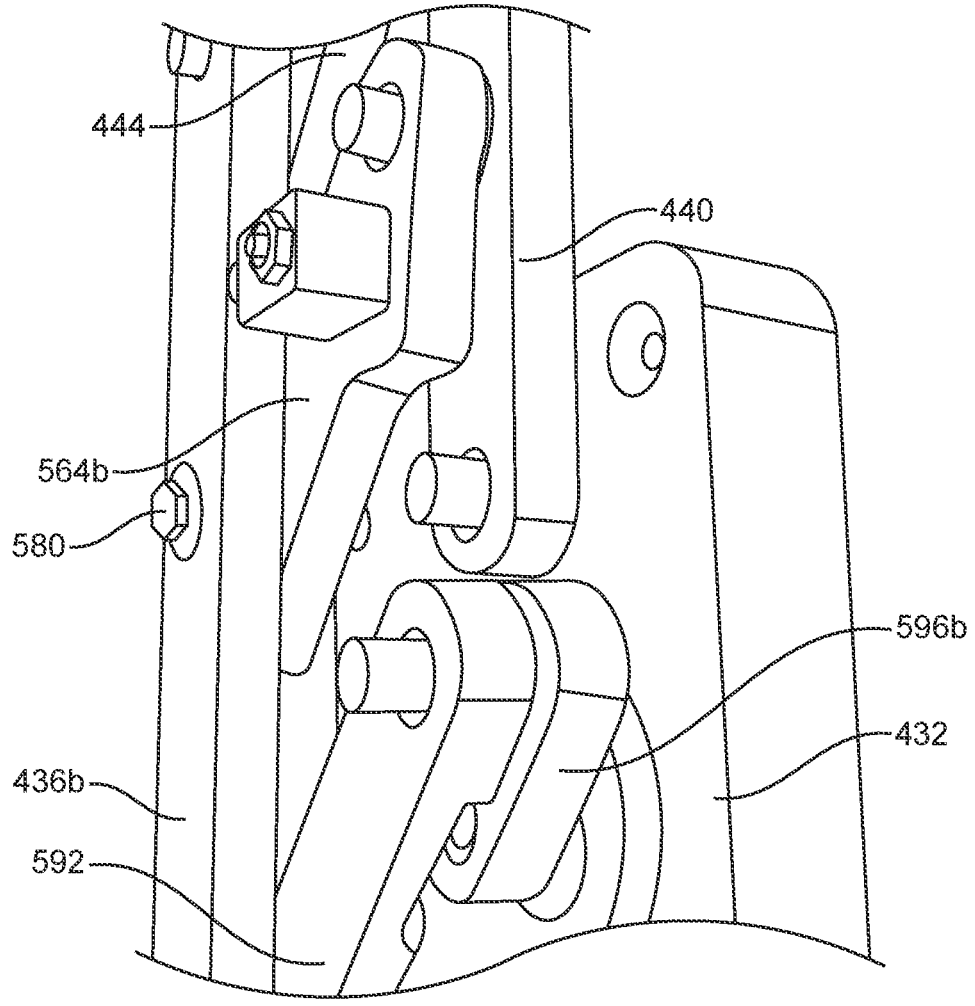
FIG. 13A is a perspective view of another embodiment of a miter saw according to the present invention.
Figure 13B:
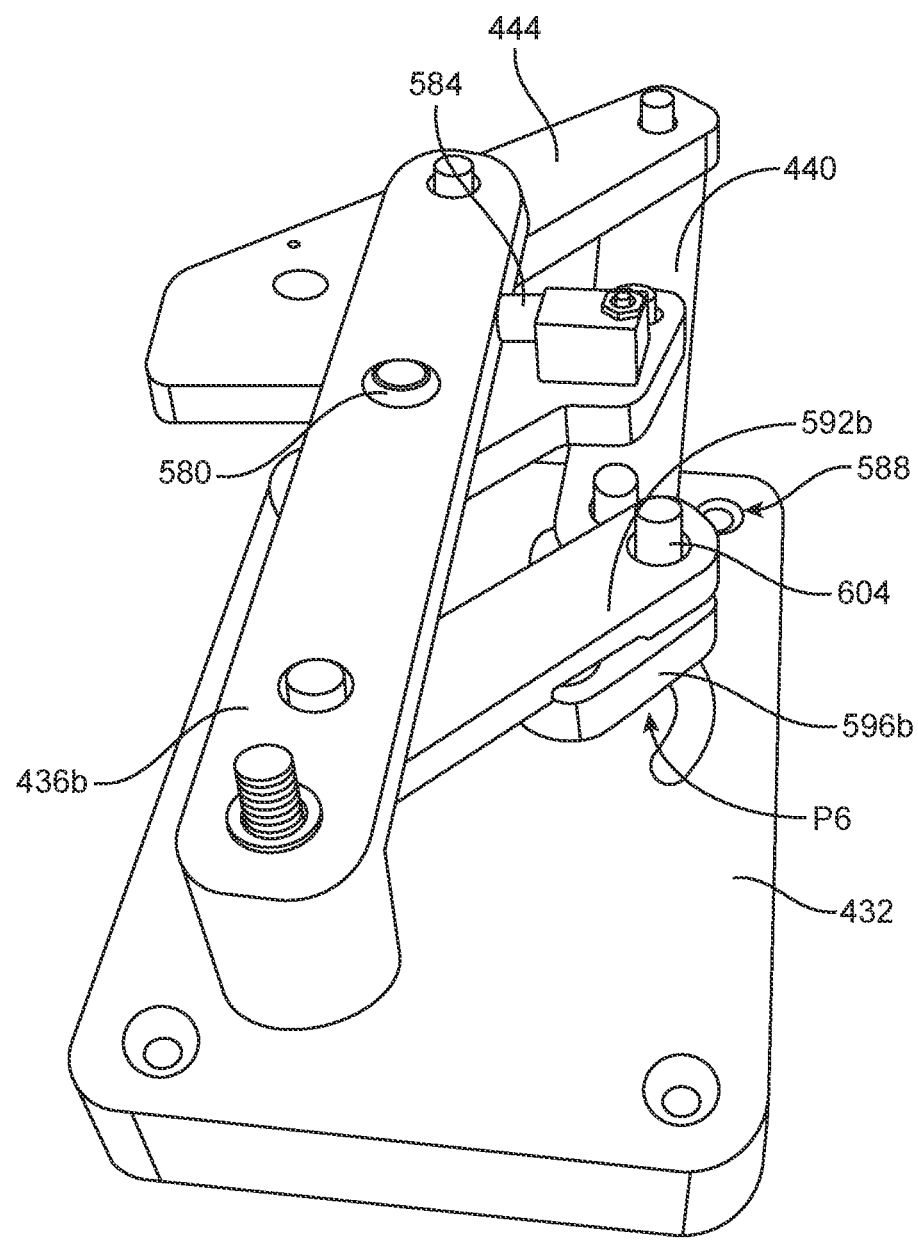
FIG. 13B is a perspective view of the miter saw according to FIG. 13A.
Figure 13C:
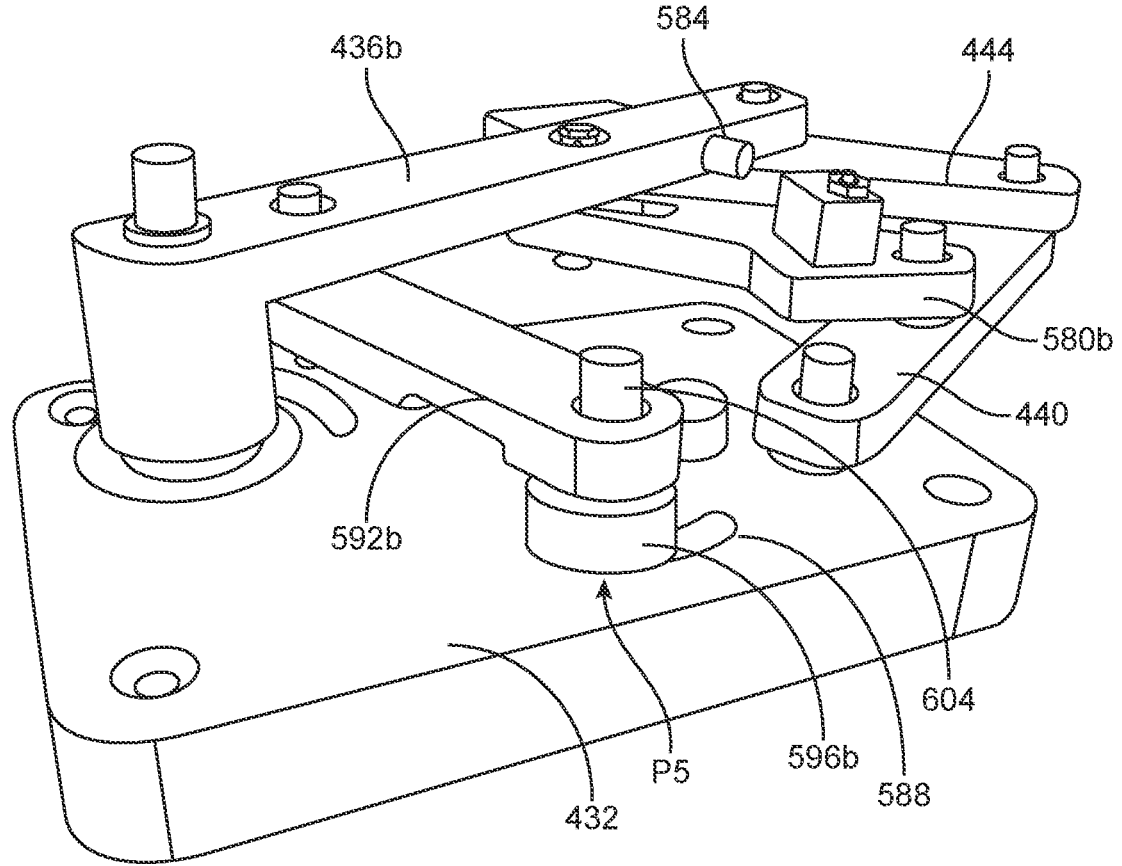
FIG. 13C is a perspective view of the miter saw according to FIG. 13A.

FIGS. 13A-13C further illustrate operation of a partial embodiment of the linkage assembly 416. FIG. 13A illustrates the linkage assembly 416 in a position in which the cutting assembly would be positioned in the rearward position P2. As shown in FIGS. 13B and 13C, the locking shaft 604 and the slide locking mechanism 588 are pivoted from the locked position P6 (FIG. 13B) to the unlocked position P5 (FIG. 13C), thereby allowing the first and second linkages 436, 440 to pivot relative to the ground link 432 and cutting assembly 420 to slide between the rearward position P2 and the forward position P1.

Although the invention has been described in detail with reference to certain preferred embodiments, variations and modifications exist within the scope and spirit of one or more independent aspects of the invention as described.

What is claimed is:

1. A miter saw configured to cut a workpiece in a cutting operation, the miter saw comprising:
   a base;
   a table defining a supporting surface on which the workpiece is supported for the cutting operation, the table rotatably coupled to the base and rotatable about a miter axis;
   a cutting assembly including a housing supporting a motor, a saw blade rotatably coupled to the motor, and a handle extending from the housing, the cutting assembly being pivotable from a raised position to a lowered position and movable relative to the table between a forward position and a rearward position; and
   a linkage assembly pivotally coupled to the table and to the cutting assembly, the linkage assembly including a floating link having a first end to which the cutting assembly is pivotally coupled, a first link pivotally coupled at a first end to the table and at a second end to a second end of the floating link, and
   a second link pivotally coupled at a first end to the table and at a second end to the floating link, between the first end and the second end of the floating link; and
   a travel stop mechanism pivotally coupled to the first linkage between the first end and the second end of the first linkage and slidingly coupled to the second linkage between the first end and the second end of the second linkage.

2. The miter saw of claim 1, further comprising a locking assembly, the locking assembly engaging the linkage assembly and maintaining a slide position of the cutting assembly between the forward position and the rearward position.

3. The miter saw of claim 1, wherein the saw blade defines a cutting plane that is coplanar with and including a side surface of the saw blade, wherein the floating link includes a left floating link and a right floating link disposed on opposite sides of the cutting plane, wherein the first link includes a left first link and a right first link disposed on opposite sides of the cutting plane, and wherein the second link includes a left second link and a right second link disposed on opposite sides of the cutting plane.

4. The miter saw of claim 1, wherein the linkage assembly further comprises a slide stop coupled to the floating link, the slide stop engaging the first link when the cutting assembly is in the rearward position, the slide stop engaging the second link when the cutting assembly is in the forward position.

5. The miter saw of claim 1, wherein the cutting assembly includes a plurality of rotation stops.

6. The miter saw of claim 1, further comprising a ground link pivotally coupled to the table, the ground link pivotable about a ground axis, the first link pivotally coupled at a first end to the ground link, and the second link pivotally coupled at a first end to the ground link.

7. The miter saw of claim 1, wherein the saw blade is slidable relative to the table along a generally linear, horizontal path.

8. A miter saw configured to cut a workpiece in a cutting operation, the miter saw comprising:
   a base to which a table is pivotally coupled;
   a linkage assembly including
      a ground link pivotally coupled to the table,
      a first linkage having a first end and a second end, the first end pivotally coupled to the ground link,
      a second linkage having a first end and a second end, the first end pivotally coupled to the ground link,
      a floating link pivotally coupled to the second end of the first linkage and the second end of the second linkage;
   a travel stop mechanism slidingly coupled to the first linkage between the first end and the second end of the first linkage and pivotally coupled to the second linkage between the first end and the second end of the second linkage;
   a slide locking mechanism including a locking shaft pivotable between a locked position and an unlocked position, the locking shaft engaging the ground link when in the locked position to bind movement of the linkage assembly; and
   a cutting assembly including a housing, a motor supported in the housing, and a saw blade rotatably coupled to the motor, the cutting assembly coupled to the floating link and slidable relative to the table.

9. The miter saw of claim 8, wherein the saw blade is slidable relative to the table along a generally linear horizontal path.

10. The miter saw of claim 8, wherein the slide locking mechanism further comprises:

an upper linkage pair coupled to the ground link and including a left upper linkage and a right upper linkage, and a lower linkage pair coupled to the ground link and including a left lower linkage and a right lower linkage, and wherein the locking shaft is coupled to the upper linkage pair and the lower linkage pair, and extending between the left upper linkage and the left lower linkage, and the right upper linkage and the right lower linkage.

11. The miter saw of claim 10, wherein the upper linkage pair defines a first line of action extending along the upper linkage pair, the lower linkage pair defines a second line of action, and wherein, in the locked position, the first line of action is above the second line of action.

12. The miter saw of claim 8, wherein the linkage assembly includes a biasing member to bias the cutting assembly to a position away from a user.

13. The miter saw of claim 12, wherein the biasing member is coupled to the first linkage and the travel stop mechanism.

* * * * *